May 27, 1930.　　P. M. VAN VALKENBURG　　1,760,455
MATERIAL SPREADER
Filed April 28, 1928　　2 Sheets-Sheet 1
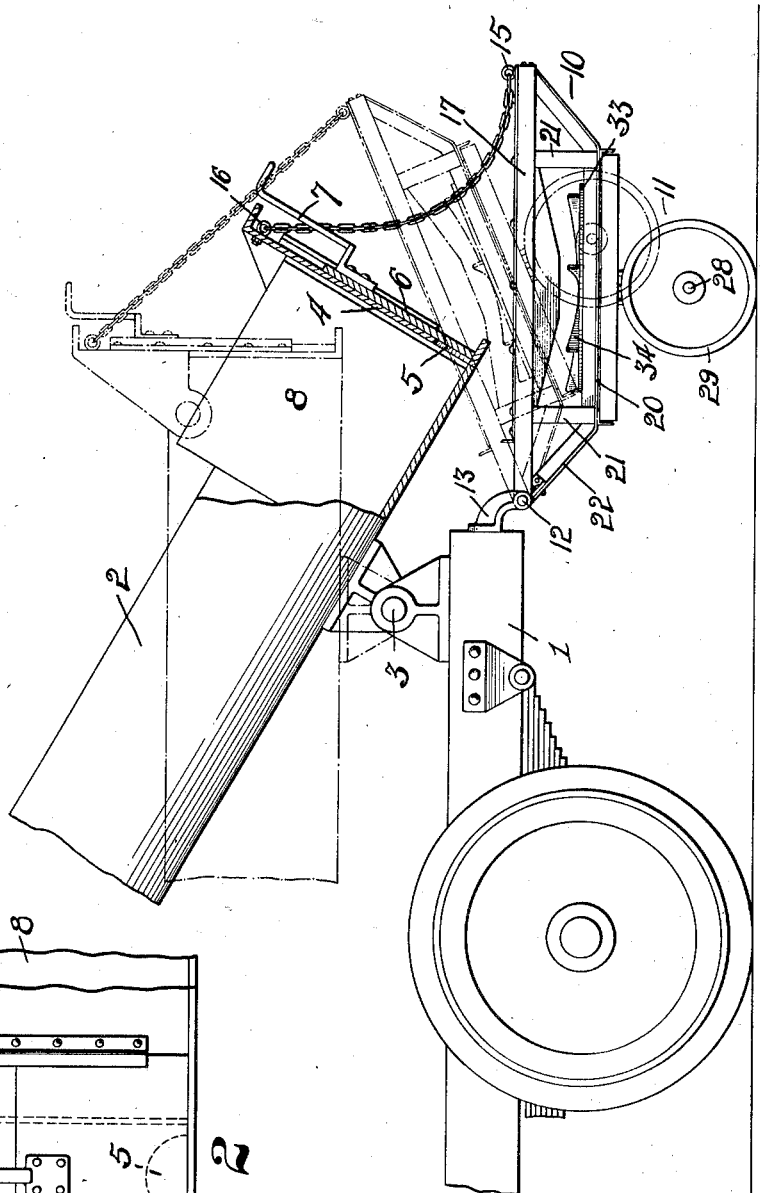
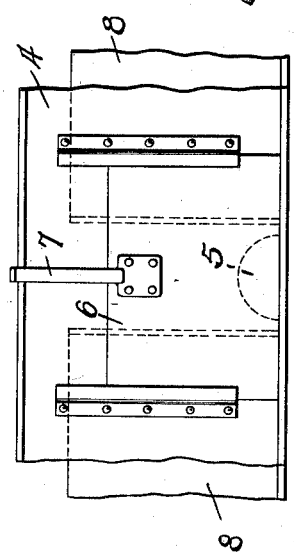
Inventor
Percy M. Van Valkenburg
By Owen & Owen
Attorneys May 27, 1930.   P. M. VAN VALKENBURG   1,760,455
MATERIAL SPREADER
Filed April 28, 1928   2 Sheets-Sheet 2
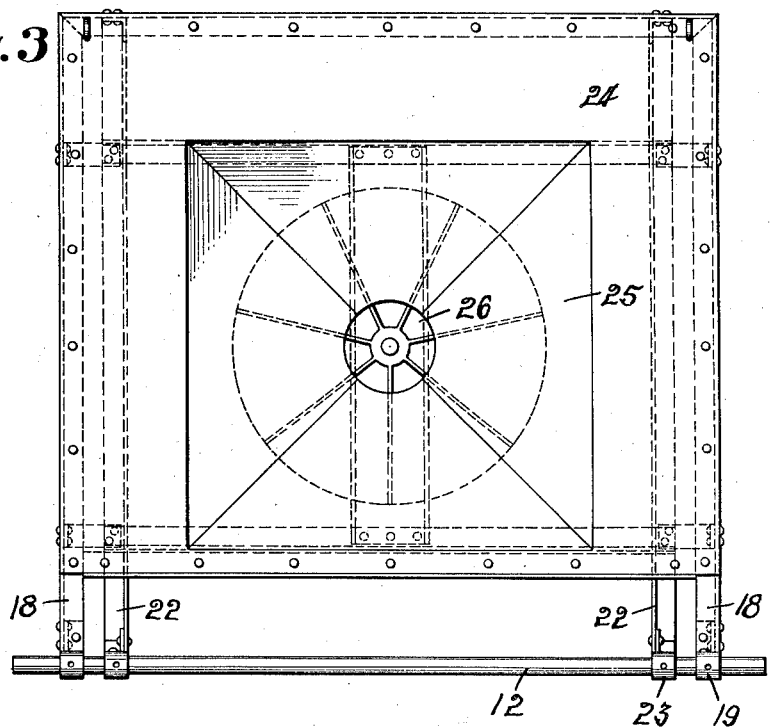
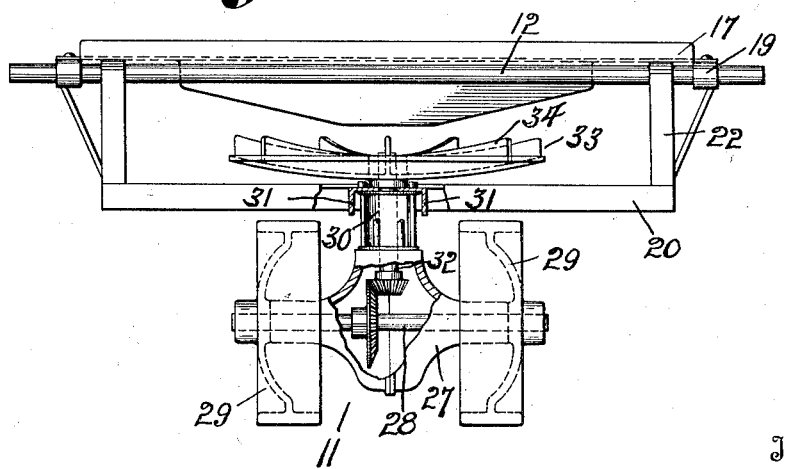

Patented May 27, 1930

1,760,455

UNITED STATES PATENT OFFICE

PERCY M. VAN VALKENBURG, OF ANDRIAN, MICHIGAN

MATERIAL SPREADER

Application filed April 28, 1928. Serial No. 273,509.

This invention relates to centrifugal spreaders intended more particularly for spreading sand, gravel or crushed stone upon roadways.

The object of the invention is the provision of a spreader of this character of novel construction and arrangement of parts, adapted to be attached as a trailer to a truck and used primarily in connection with a truck of the tilting dump body type in a manner to cause the trailer to be elevated to inoperative position when the truck body is in normal load carrying position and to be lowered to operative position when the truck body is tilted for dumping.

Other objects and advantages of the invention will be apparent from the following detailed description.

The invention is fully described in the following specification, and while in its broader aspect it is capable of embodiment in different forms a preferred embodiment thereof is illustrated in the accompanying drawings, in which,—

Figure 1 is a fragmentary side elevation of a truck with the dump body shown in full lines in elevated dumping position and with a spreader embodying the invention in operative connection therewith. Fig. 2 is a fragmentary rear end elevation of the truck body. Fig. 3 is a top plan view of the trailer embodying the invention, and Fig. 4 is a front elevation thereof with parts broken away.

Referring to the drawings, 1 designates the chassis frame of a truck, and 2 a dump body mounted thereon for tilting movements about an axis 3. The rear end of the frame 1 and is provided with a rear end closure plate 4 having a discharge opening 5 in its central body portion controlled by a slide gate 6 having a handle 7 rising therefrom. The material in the dump body is directed toward the opening 5 in the discharging operation by diagonally disposed side boards 8.

The spreader embodying the invention is of trailer form and comprises a frame 10 supported by a truck 11 and having its forward end provided with a cross-shaft 12 having bearings in bracket arms 13 which are rigidly secured to and project rearwardly and downwardly in transversely spaced relation from the rear end of the chassis frame 1 whereby the trailer is permitted to have vertical swinging movements. The rear end of the trailer frame is connected by a pair of chains 14, one at each side, to the upper edge portion of the end plate 4 of the truck dump body 2. For this purpose the chains 14 are connected at their lower ends to respective eyes 15 on the spreader frame and at their upper ends to respective eyes 16 on the truck body. Thus a substantially permanent connection is provided between the trailer forming the spreader and the truck body so that when the truck body is in normal lowered position the trailer is raised to inoperative position, as shown in dotted lines in Fig. 1, and when the truck body is in raised load discharging position the trailer is resting on the surface over which it travels, as shown in full lines in Fig. 1.

The trailer frame 10 comprises a top rectangular frame 17, preferably of angle iron construction, with the two side bars of such frame projecting forwardly therefrom to form arms 18 having bearings 19 at their free ends for receiving the shaft 12. The trailer frame 10 also includes a sub-frame 20 of rectangular form, which is connected to and rigidly spaced from the top frame 17 by corner uprights 21. The side bars of the frame 20 are extended at their rear ends beyond such frame and inclined upwardly therefrom to the rear end of the top frame 17 to which they are secured and the forward ends of such side bars form arms 22, which project upwardly and forwardly from the frame 20 and have bearings 23 at their free ends receiving the shaft 12. A top plate 24 covers the top frame 17 and forms a hopper 25 disposed in position to receive the discharge of material from the dump body 2 and has a central discharge opening 26 disposed in substantially centered relation to the sub-frame 20 of the trailer.

The truck 11 of the trailer comprises a frame or axle housing 27 having a horizontal shaft 28 mounted therein and carrying truck wheels 29 without the housing, at least one of said wheels being fixed to the shaft to drive the same. The housing 27 has an upward extension 30 fixedly secured to cross-bars 31 of the sub-frame 20 and having a vertically disposed shaft 32 mounted therein with its lower end in geared connection to the shaft 28.

The upper end of the shaft 32 carries a spreader wheel 33 below and in centrally disposed relation to the hopper opening 26, so that the discharge from such hopper is received on the wheel. This wheel is of disc form with its top preferably dished and provided with a plurality of radially extending ribs 34.

It is apparent that when the spreader is trailing behind the truck with its wheels 29 resting on the road surface, the wheels will be caused to rotate by tractive action and one, at least, will communicate a rotary movement to the spreader wheel 33 due to the driving connection therebetween. If material is being discharged from the truck body 2 into the hopper 25 of the trailer and thence through the hopper opening 26 onto the spreader wheel 33 when such wheel is rotating, the material will be discharged by centrifugal action uniformly from the wheel within a radius depending on the speed of rotation of the wheel, thus effecting an even distribution of the material over the road or other surface to which delivered.

During a distribution of the material, the operator may stand on the trailer frame in convenient position to control the gate 16 and the consequent delivery of the material to the spreader.

It is apparent that the construction of the trailer frame is such as to render it strong and durable and at the same time light and inexpensive, and that it also provides an open space entirely around the spreader wheel with nothing to impede or interfere with the even distribution of the material by such wheel, with the exception of the narrow corner uprights 21 of the frame. It is also apparent that no driving means for the spreader wheel is employed other than the tractive action of the wheels 29 on the surface over which traveling, and that the trailer is only in operative position, with the wheels 29 in engagement with the road surface, when the truck body 2 is in raised material dumping position.

I wish it understood that my invention is not limited to any specific construction, arrangement or form of the parts, as it is capable of numerous modifications and changes without departing from the spirit of the claim.

Having thus described my invention, what I claim as new and desire to secure by Letters Patent is:—

The combination with a truck having a chassis, a tiltable dump body mounted thereon, and brackets rigidly secured to the rear end of the chassis and extending rearwardly and downwardly therefrom, the rear ends of said brackets being provided with bearings, of a trailer, a transverse horizontal shaft secured in the front side of the trailer frame and journaled in said bearings to provide a pivotal connection between the truck chassis and the trailer so that the latter has up and down swinging movement with respect to the truck, means constituting a substantially permanent connection between the rear part of the trailer and the upper part of the truck body to cause a raising of the trailer from the ground by said body when lowered to normal position and to cause a lowering of the trailer when the truck body is tilted to dumping position, and means carried by the trailer and operative by tractive action to effect a centrifugal spreading of material discharged from the truck body.

In testimony whereof I have hereunto signed my name to this specification.

PERCY M. VAN VALKENBURG.